UNITED STATES PATENT OFFICE

JOHN C. BAKER, OF MONTCLAIR, AND FRANZ C. SCHMELKES, OF NORTH ARLINGTON, NEW JERSEY, ASSIGNORS TO WALLACE & TIERMAN PRODUCTS, INC., OF BELLEVILLE, NEW JERSEY, A CORPORATION OF NEW JERSEY

PROCESS OF IMPROVING THE TASTE AND ODOR OF WATER

No Drawing.   Application filed August 18, 1928. Serial No. 300,616.

This invention relates to a method of improving the taste and odor of water treated with chlorine. The invention comprises a process of eliminating or minimizing the after taste and odor of water treated with chlorine, and particularly water containing phenol, wherein a certain small concentration of iron compound is established in the water to be present with the chlorine, the presence of an ammonium compound being also advantageous; all as more fully hereinafter set forth and as claimed.

Water for city and town water supplies, and other water intended for drinking purposes, is now commonly sterilized by having added thereto minute proportionate amounts of chlorine. The water supplied to cities and towns is now quite generally drawn from lakes and rivers, and such surface water is apt to contain substances or compounds which give to the water a bad or disagreeable taste and odor, and more especially substances which produce such tastes and odors on treatment of the water with chlorine. Even when the water has been subjected to coagulation and filtration, minute quantities of such substances are found to remain in the water giving rise to objectionable taste and odor, especially when the water is sterilized after filtration.

In most cases, the objectionable taste and odor is due to the presence in the water of phenol or phenolic compounds in such minute quantity as not to be detectable by taste or odor before the water is treated with a sterilizing agent. It frequently happens, however, that the treatment with chlorine of water containing such small amounts of phenol which before such treatment are not detectable by taste or odor results in a pronounced bad taste and odor, due to the reaction between the chlorine and phenolic compound producing chloro-phenols.

The reaction which takes place in the water between chlorine and the phenol is a progressive reaction. The mono compounds, which are the first produced, have the most pronounced bad taste and odor; and with further increase in the chlorine content of the compounds the taste and odor become progressively fainter. We believe that during such progressive reaction there is never more than a minor part of the total phenol in the water present in the mono-chlorophenol stage, the remainder being either not yet attacked by the chlorine or further chlorinated into the less objectionable poly-chlorophenol product. The reaction between phenol and chlorine seems to take this course:

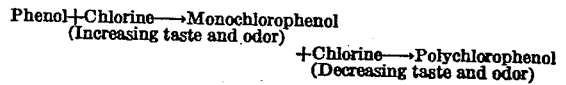

The ratio of chlorine to phenol is apparently the governing factor determining the extent to which the reaction proceeds; and with the minute proportionate amount of chlorine used in the sterilization of potable water this frequently results in at least a considerable part of the phenol in the water being present in the form of mono-chlorophenol at the time the water reaches the place of consumption.

Efforts have been made heretofore to lessen the bad taste and odor of waters treated with chlorine by increasing the chlorine dosage so as to cause the reaction between the chlorine and the phenol to proceed to the stage in which the products of the reaction are comparatively inoffensive, or by decreasing the chlorine dosage so as to avoid, at least largely, the production of the highly offensive mono-chlorophenol.

The method of super-chlorination is, however, unsatisfactory and expensive. The reaction between the chlorine and the phenol takes place slowly, so that a considerable period of time must elapse after the sterilizing treatment of the water with chlorine before the water is ready for distribution, and after this period has elapsed the water must be dechlorinated to get rid of the excess chlorine. The excess chlorine added to the water and the chemical required for dechlorination add a large item to the expense of treatment of the water.

To avoid the trouble by decreasing the chlorine dosage is dangerous, for the reason that the water may not be sufficiently sterilized, and, furthermore, this method cannot be used where the law prescribes a specified chlorine residual for a specified time after treatment.

We have discovered that the objectionable taste and odor of chlorine-treated water resulting from the presence in the water of substances other than chlorine may without increasing the customary chlorine dosage, be quickly wholly eliminated, or so greatly lessened as to be practically unnoticeable, by the addition to the water of a soluble iron salt in such relatively minute quantity that the presence of the iron remaining in the water is not objectionably noticeable. The iron salt apparently acts as an accelerator of the reaction between the chlorine and phenol, speeding up the entrance of the first chlorine into the phenol and also the entrance of further atoms of chlorine, and thus quickly carrying the reaction past the mono-chlorophenol stage to the stage in which the resulting compounds are substantially without objectionable taste or odor. In other words, we believe that in the presence of the iron salt acting as a catalyst the customary small excess of chlorine produces more rapidly the same action as is effected in the super-chlorination process by the presence of a relatively large excess of chlorine. We have found that by our method, in treating water containing phenol in the concentration commonly met with and which is sterilized by the addition of the usual proportionate amount of chlorine leaving the usual amount of residual chlorine, the desired reaction resulting in the practically complete elimination of bad taste and odor from the water is accomplished in a few minutes, usually 5 to 15 minutes, as against a period of one or two hours required for the super-chlorinating treatment.

Furthermore, we have found that when an ammonium salt is used with the iron salt, either as a mixture or as a chemical compound, the results have been still better. Ferrous sulphate is apparently the most effective of the iron salts, and ferrous ammonium sulphate and ferrous sulphate with ammonium salt have been found to be the most effective accelerators of all. An ammonium salt without the iron apparently retards the desired reaction; that is, it has an effect opposite to that desired. In using an ammonium salt with the iron salt, only a small amount of the ammonium salt, less than the amount of iron salt, need be used.

The use of the iron or iron-ammonium salt as an accelerator or catalyst avoids all necessity of resorting to either super-chlorination or under-chlorination for getting rid of the bad taste and odor of the sterilized water, and makes it generally possible to treat the water with the usual proportionate amount of chlorine required for sterilization such as is used in waters which do not contain phenol or other bad taste-and-odor-developing substances. That is, it makes it possible to use a chlorine dosage which will not leave a chlorine taste in the water, but is, on the other hand, amply sufficient to accomplish complete sterilization, thus avoiding the use of any such excess amount of clorine and subsequent de-chlorination. The new method thus not only effects an important saving of time, but also effects a large saving in cost: that is, the difference between the cost of super-chlorination and de-chorination on the one hand, and the cost of the small amount of the accelerating material on the other hand.

So far as we have been able to discover, it makes no difference whether the accelerating material is added to the water before the chlorine, at the same time with the chlorine, or shortly afterward. It should, of course, be present in the water at the time that there is the required amount of free chlorine in the water.

As to the amount of iron required to be added to the water to accomplish the desired result, we have found that the presence of 0.1 part of iron to one million parts of water will take care of most phenol concentrations encountered in actual practice in as little as 5 or 10 minutes. Should the phenol content of the water rise as high as .05 p. p. m., which is very seldom the case, then 0.15 p. p. m. of iron is sufficient to substantially eliminate the bad tasting and bad smelling compounds. For example: .71 p. p. m. $FeSO_4 \cdot (NH_4)_2SO_4 \cdot 6H_2O$, containing 0.1 p. p. m. iron and somewhat less than 0.1 p. p. m. $NH_4$, has been found to prevent bad taste and odor in water containing .02 p. p. m. phenol in the presence of the usual residual chlorine.

If an iron salt is used alone, the amount required is slightly, although not much, greater. The amount of iron required to be used is thus extremely small—so small that the presence in the water of the iron is entirely unobjectionable. The action of the iron is apparently that of, or in the nature of, a catalyst. After serving its purpose as an accelerator, it remains in the water. Of course, the iron might be removed before the water is supplied for use, but an important point and feature of the invention is that the amount of iron added to the water in practicing the method is so small that its presence in the water is not objectionably noticeable. The pressure of iron in potable water is not objectionably noticeable in amounts up to about one-quarter part per million, and even in water used in manufacturing plants the presence of iron up to .15 parts per million will seldom meet with objection.

Whatever the theory of action, practice has shown that a better water is secured in processes of disinfecting water with chlorine where there is a small concentration of iron in the water during the period of action of the chlorine. The treated water has less after taste and odor. All things considered, the best results are given by a concentration of iron in the water of the order of 0.1 to 0.2 parts per million. Greater quantities of iron may be present and less quantities of iron will give some of our results. But, as stated, the best results are with a content of iron of this magnitude. And the presence of an ammonium compound is desirable.

The accelerating agent may be added to the water in a dry state, or may be made into a relatively strong solution: for example, a 1000 p. p. m. solution of ferrous ammonium sulphate; the solution being then fed into the water. In either case, thorough distribution of the accelerator in the water should be secured, and in treating flowing water the feed of the accelerating material may be varied with variations in the rate of flow of the water.

In some cases, when it is found difficult to remove the taste or odor, either because of the short time available or excessive amount of phenol in the water, or low temperature, or for other reasons, it is desirable to slightly increase the amount of chlorine which would otherwise be used so as to hasten the reaction between the chlorine and the phenolic compounds, and when such increased amount of chlorine is used it may be desirable to dechlorinate the water after the taste and odor have been eliminated, as by adding a reducing agent such as sulphur dioxide, hydrogen, metallic iron or other known dechlorinating substances.

In using ferrous salt, some chlorine combines with it to form ferric salt. Therefore, in using ferrous salt, a slight excess of chlorine should theoretically be required over that required when ferric salt is added to the water. The amount of chlorine which so combines with the ferrous salt is so small, however, that it usually need not be considered in actual practice. The amount of chlorine so consumed is substantially less than the amount of residual chlorine which ordinary practice provides in water.

The term "residual chlorine" is used herein in its usual sense of meaning the slight excess of chlorine which remains as such in the water a few minutes after treatment. A sufficient chlorine dosage to secure the presence of a small amount of residual or free chlorine in the water ten minutes or so after treatment is generally considered necessary for ensuring complete sterilization, and in many States a specified chlorine residual is required by law. Usually from .1 to .3 p. p. m. of free chlorine ten minutes after treatment is sufficient. The amount of iron added is, therefore, below the amount of chlorine added to the water and in fact is normally below the residual chlorine remaining after ten minutes treatment.

What is claimed is:

1. The method of treating water, which comprises sterilizing the water by adding chlorine thereto in proportionate amount sufficient to leave the usual residual, and preventing taste and odor resulting from the reaction between chlorine and substances in the water by adding to the water a small proportionate amount of a soluble iron salt with ammonia or an ammonium compound insufficient to be objectionable in the water.

2. The method of treating water, which comprises sterilizing the water by adding chlorine thereto in proportionate amount sufficient to leave the usual residual, and preventing taste and odor resulting from the reaction between chlorine and substances in the water by adding to the water a small proportionate amount of ferrous ammonium sulphate insufficient to be objectionable in the water.

3. The method of treating water, which comprises sterilizing the water by adding chlorine thereto in proportionate amount sufficient to leave the usual residual, and preventing taste and odor resulting from the reaction between chlorine and substances in the water by adding to the water a soluble iron salt in amount containing less than 0.2 parts of iron to one million parts of water.

4. The process of treating water, which comprises sterilizing the water by the addition of chlorine thereto, and accelerating the reaction between chlorine and phenolic compounds in the water by establishing in the water small proportionate amounts of iron compound and an ammonium compound.

5. In the sterilization of water by chlorine, the process of preventing unpleasant taste and odor, and particularly with waters containing phenol, which comprises adding a sufficient amount of a soluble iron salt to such water to establish therein an iron concentration of the order of 0.1 to 0.2 parts per million together with a smaller amount of an ammonium salt.

6. In the sterilization of water by chlorine, the process of preventing unpleasant taste and odor, and particularly with waters containing phenol, which comprises adding a sufficient amount of a sulphate containing ferrous to such water to establish therein an iron concentration of the order of 0.1 to 0.2 parts per million together with a smaller amount of ammonium sulphate.

JOHN C. BAKER.
FRANZ C. SCHMELKES.

CERTIFICATE OF CORRECTION.

Patent No. 1,866,524.                                           July 12, 1932.

JOHN C. BAKER, ET AL.

It is hereby certified that error appears in the printed specification of the above numbered patent requiring correction as follows: Page 2, line 85, before "time" insert the word same; and line 120, for "pressure" read presence; page 3, line 117, claim 6, after the syllable "rous" insert the word iron; and that the said Letters Patent should be read with these corrections therein that the same may conform to the record of the case in the Patent Office.

Signed and sealed this 28th day of May, A. D. 1935.

Leslie Frazer (Seal)                                  Acting Commissioner of Patents.